United States Patent [19]

Gelling et al.

[11] Patent Number: 4,769,416

[45] Date of Patent: Sep. 6, 1988

[54] ELASTOPLASTIC COMPOSITIONS

[75] Inventors: Ian R. Gelling, Welwyn; Andrew J. Tinker, Buntingford; Carl L. Riddiford, Birch Green, all of England

[73] Assignee: The Malaysian Rubber Producers' Research Association, Brickendonbury, England

[21] Appl. No.: 27,409

[22] Filed: Mar. 18, 1987

[30] Foreign Application Priority Data

Mar. 19, 1986 [GB] United Kingdom ............... 8606808

[51] Int. Cl.$^4$ .................... G08L 23/04; C08L 53/00; C08L 63/08
[52] U.S. Cl. ..................... 525/90; 525/194; 525/232
[58] Field of Search ............ 525/194, 232, 90

[56] References Cited

U.S. PATENT DOCUMENTS

| | | | |
|---|---|---|---|
| 4,299,931 | 11/1981 | Coran et al. | 525/194 |
| 4,487,892 | 12/1984 | Ohmori et al. | 525/232 |
| 4,607,074 | 8/1986 | Hazelton et al. | 525/232 |
| 4,624,989 | 11/1986 | Berta | 525/194 |

*Primary Examiner*—Allan M. Lieberman
*Attorney, Agent, or Firm*—Wenderoth, Lind & Ponack

[57] ABSTRACT

The elastoplastic composition comprises a blend of a thermoplastic polyolefin resin, such as polypropylene, and vulcanized epoxidized natural rubber and has good oil resistance without the use of nitrile rubber and has good mechanical properties without the need for compatibilizing agents. The elastoplastic composition may be prepared by a method which comprises mixing the thermoplastic polyolefin resin and epoxidized natural rubber at a temperature sufficient to soften or melt the resin to give an intimate blend, then while continuing mixing, adding curative for the rubber and vulcanizing the epoxidized natural rubber at a vulcanization temperature.

14 Claims, No Drawings

ELASTOPLASTIC COMPOSITIONS

The present invention relates to elastoplastic (i.e. elastomeric thermoplastic) compositions comprising blends of cured epoxidised natural rubber and polyolefins, particularly polypropylene. It also relates to a method of producing such compositions.

Elastoplastic compositions comprising blends of cured rubber and polyolefin resin are known from U.S. Pat. No. 3,037,954. The compositions are produced by a technique which is now generally known as dynamic vulcanisation according to which the rubber is cured during mixing with the molten polyolefin. According to Campbell et al, "Natural Rubber Technology", Vol. 9, pt.2 (1978) p 21–31, elastoplastic blends of partially-crosslinked natural rubber and polypropylene have good mechanical properties. Unfortunately, however, elastoplastic blends of cured natural rubber and polypropylene suffer from poor oil-resistance. It was proposed that this problem could be overcome by replacing the natural rubber in such blends by nitrile rubber, which is known to be more resistant than natural rubber to swelling by oils. However, it was found that dynamically vulcanized blends of polypropylene with nitrile rubber have relatively poor ultimate properites due to the disparity of the critical surface tension for wetting, which arises from the relatively large difference in the solubility parameters of the two polymers (Coran et al, "Rubber Chemistry and Technology", Vol. 55 (1982) pages 116-136). In order to overcome the gross mutual incompatibility of olefin polymers and nitrile rubber such that compositions having improved ultimate properties can be obtained, the addition to the blend of polymers of a "compatibilizing agent", comprising a block copolymer having an olefin polymer-compatibilizing segment chemically linked to a nitrile rubber-compatibilizing segment, is proposed by A.Y. Coran and R. Patel in "Rubber Chemistry and Technology", Vol.56 (1983) pages 1045-60 and EP-A-0036279.

The present invention is based on the discovery that we can produce an elastoplastic composition having good oil resistance without the use of nitrile rubber and having good mechanical properties without the necessity of using compatibilizing agents.

The present invention provides an elastoplastic composition comprising a blend of a thermoplastic polyolefin resin and vulcanized epoxidised natural rubber.

The present invention also provides a method of producing an elastoplastic composition comprising a blend of a thermoplastic polyolefin resin and vulcanized epoxidised natural rubber which method comprises mixing the thermoplastic polyolefin resin and unvulcanized epoxidised natural rubber at a temperature sufficient to soften or melt the resin so as to form an intimate mixture of resin and epoxidised natural rubber, then while continuing the mixing adding curative for the rubber in an amount sufficient to achieve essentially complete gelation of the epoxidised natural rubber, and continuing the mixing at a vulcanization temperature until vulcanization of the epoxidised natural rubber is complete. Essentially complete gelation of the epoxidised natural rubber is taken to mean that greater than 80% of the epoxidised natural rubber in the elastoplastic composition is insoluble when the composition is extracted with toluene at 40° C. for 24 hours with periodic agitation.

Epoxidised natural rubber is a modified form of natural rubber in which some of the unsaturation is replaced by epoxide groups. The solubility parameter of epoxidised natural rubber is greater than that of natural rubber, which is also greater than those of polyolefins. Therefore, the differences between the solubility parameters of epoxidised natural rubber and polyolefins are greater than the differences between the solubility parameters of natural rubber and polyolefins. In fact, the difference between the solubility parameters of polypropylene and natural rubber epoxidised to 50 mole precent is twice the difference for polypropylene and natural rubber. It would, therefore, be expected that dynamically vulcanized blends of epoxidised natural rubber with polyolefins would have poorer mechanical properties than comparable dynamically vulcanized blends of natural rubber and polypropylene. To our surprise, however, we discovered that the composition of the present invention has good mechanical properties similar to those of elastoplastic blends of cured natural rubber and polyolefins. The mechanical properties of the composition of the present invention are, of course, superior to those of comparable elastoplastic blends of cured nitrile rubbers and polyolefins which do not contain a compatibilizing agent.

In the practice of the present invention, we have achieved good results using an epoxidised natural rubber having a level of epoxide modification of about 50 mole %. However, other levels of epoxide modification of the natural rubber may be used and, in general, the epoxide level will be in the range of from 15 to 85 mole %. Typically, the epoxidised natural rubber will have a Mooney viscosity of 20 to 150 at 100° C.

Suitable thermoplastic polyolefin resins for use in the present invention are solid products, typically having a melt flow index, measured under conditions applicable to the particular polyolefin, of 0.1 to 30 g/10 min (ISO 1133), which are obtained by the polymerisation of one or more olefins. Examples of such thermoplastic polyolefins include polyethylene and polypropylene, which are both commercially available. Preferably, the polyolefin used in the present invention is polypropylene since this has the most desirable combination of properties.

In general, blends of the invention will comprise, per one hundred parts by weight of the total polymer composition, from 85 to 10 parts by weight of vulcanized epoxidised natural rubber and from 15 to 90 parts of polyolefin. Preferably, however, the elastoplastic composition of the invention will comprise from 80 to 10 parts by weight of vulcanized epoxidised natural rubber and from 20 to 90 parts by weight of the polyolefin and more preferably from 80 to 35 parts by weight of vulcanised epoxidised natural rubber and from 20 to 65 parts by weight of the polyolefin.

Although, as is discussed above, the compositions according to the present invention have mechanical properties similar to those achieved by comparable compositions containing dynamically vulcanized natural rubber, without the addition of compatibilizing agents to increase the compatability of the blend components, such agents may be incorporated, if desired, into the composition of the invention. Compatibilizing agents suitable for use in the present invention will be block copolymers having at least one segment which is compatible with the polyolefin being used in the blend and at least one segment which is compatible with epoxidised natural rubber. It is, of course, possible to form such compatibilizing agents in situ by incorporating, into the initial blend of polyolefin and epoxidised natural rubber, a small amount of a suitable modified polyolefin. An example of a suitable modified polyolefin is polypropylene modified with phenolformaldehyde resin in the presence of stannous chloride dihydrate and magnesium oxide as described in EP-A-0036279.

Typically, the composition of the invention may be produced by mixing the polyolefin and the epoxidised natural rubber at a temperature sufficient to cause softening or, preferably, melting of the polyolefin. If a compatibilizing agent, as described above, is to be used then this will be added to the initial polyolefin/epoxidised natural rubber blend. Suitable levels of compatibilizing agent are 0 to 25 parts per hundred parts by weight of the total polymer. Alternatively, if the compatibilizing agent is to be formed in situ, the necessary precursor(s) will be added to the initial blend. Suitable levels of the precursor, in terms of modified polyolefin, are zero to total replacement of the polyolefin in the blend. The mixing can be carried out in any conventional masticating equipment, such as a rubber mill, Brabender mixer, Banbury mixer or twin-screw continuous mixer. The polymers are melt blended by mastication for a short period of time, typically ½ to 30 minutes, more usually 1 to 5 minutes, until a uniform blend is obtained. After this, one or more curatives to vulcanize the epoxidised natural rubber are added while mastication is continued. As curatives, one may use any curing agent or curative system applicable for the vulcanization of epoxidised natural rubbber in the practice of the invention. Suitable curatives include, for example, the so-called efficient accelerated sulphur vulcanization systems which contain a low level of elemental sulphur, maleimide initiated with a peroxide or a disulphide accelerator, urethane, quinoid, orphenol-formaldehyde resin with an activator. It is also possible to use dicarboxylic acids as curing agents for the epoxidised natural rubber. Such acids act to cure the epoxy-containing rubber by reacting with epoxide groups to form ester groups after ring opening has occurred. (C.T. Loo in "International Rubber Conference 1985 Proceedings, Volume II", (1986), pages 368-85). The curative is added in an amount which is sufficient to achieve essentially complete gelation of the epoxidised natural rubber although care should be taken to avoid excessive amounts of curative, beyond what is necessary to cure the rubber, since such excesses may deleteriously affect the final properties of the elastoplastic composition. As an example, suitable curative levels for the maleimide system are 1 to 9 parts HVA-2 per hundred of epoxidised natural rubber initiated by peroxide at a level of 2 to 10% by weight of the HVA-2. As far as the use of other curative system is concerned, the appropriate levels for any curative system can be determined by comparison with the maleimide system. This may be conveniently be determined by comparing the torque rise in a rheometer (e.g. Monsanto ODR rheometer) at 180° C. for the curative system being determined in a compound based solely on epoxidised natural rubber with the torque rise for a compound containing the maleimide system at specified levels. After the curatives have been added, the mixing is continued until vulcanization of the epoxidised natural rubber is essentially complete, as indicated by power consumption decreasing from the peak associated with the dynamic vulcanization of the epoxidised natural rubber.

If desired, one may add one or more plasticizers at this point, in which case mixing is continued until power consumption recovers, indicating that the plasticizer has been accepted by the blend. The plasticizers are liquids which are readily accepted by the epoxidised natural rubber giving a reduction in the glass transition temperature of the polymer, and which have low volatility at temperatures below about 250° C. Examples of plasticizers that are suitable for use in the present invention include, but are not limited to, dioctyl esters of dicarboxylic acids, such as adipic, sebacic and phthalic acids or esters of such acids with higher alcohols. Suitable levels of total plasticizer are in the range 0 to 60 parts per hundred parts by weight of total polymer.

It is within the scope of the invention to incorporate into the composition, before or after vulcanization, any ingredients which are conventional in the compounding of epoxidised natural rubber and blends thereof or in the combination of polyolefins or blends thereof. Examples of such ingredients include, but are not limited to, pigments, dyes, fillers, stabilizers, antioxidants, reinforcement fibres, extender oils and other processing aids. The identities and the proportions used of such ingredients are well known in the art and need not be discussed further here, with the exception of the base which is an advisable additional antidegradant particularly when sulphur-containing curatives or antidegradants are used. Examples of suitable bases are given by N. M. Morrison in "Rubber Chemistry and Technology", (1985), pages 243-57.

The vulcanized blend can then be removed from the mixer and can, if desired, be further processed, such as by sheeting on a mill prior to granulation or passing through an extruder to a pelletizing unit. The composition of the invention, in the form of granules or pellets, is suitable as a feedstock for a plastics injection moulding machine or extruder to give a variety of articles having good resistance to swelling by oils. Another advantageous property of the composition of the invention is its good adhesion to fabrics without the need for the use of bonding agents. Such a property is particularly useful if the composition is employed to manufacture articles which contain fabric reinforcement, such as hoses.

EXAMPLES

Ingredients used to illustrate the invention are 50 mole % epoxidised natural rubber containing 0.1 to 0.2% sodium carbonate as a basic stabilizer (ENR50), homopolymer grade polypropylene with a melt flow index of 7g/10 min (Propathene GXM 43),m-phenylene bismaleimide (HVA-2), 2,5-dimethylhexane 2,5-di-t-butyl peroxide (DHBP), phenolformaldehyde resin (SP 1045), tetramethyl thiuram monosulphide (TMTM), N-cyclohexyl-2-benzothiazole sulphenamide (CBS), sulphur, zinc oxide, magnesium oxide, stearic acid, trimethylol propane trimethacrylate resin (ATM11), Novor 904 urethane crosslinker, dioctyl phthalate (DOP), dioctyl sebacate (DOS), di-isodecyl adipate (DIDA), Irganox 1010 antioxidant. The control blends comprise, in addition to some of the foregoing ingredients, a viscosity-stabilized grade of natural rubber Standard Malaysian Rubber CV (SMR CV) or nitrile rubbers with acrylonitrile contents of 18, 34, and 41% (Perbunan 1807NS, Krynac 34.50P, and Breon N41.C45 respectively) and a paraffinic oil with a low volatility, Sunpar 2280. In the Exmaples, all amounts are parts by weight per hundred parts by weight of the total polymer (pph) unless stated otherwise.

The blends 1 to 7 in Table 1 below were prepared according to the following procedure.

The natural rubber (blends 1, 2 and 7) or the epoxidised natural rubber (blends 3-6) was mixed with the polypropylene in a BR Banbury internal mixer heated with 40 psi steam on the sides and the rotors of the mixer for a time sufficient to melt the polypropylene and give a uniform blend, for about 2-4 minutes. While the mixing continued, the maleimide peroxide curative system was added and the mixing was further continued until vulcanization was judged to be essentially complete, and indicated by power consumption decreasing from the peak associated with the dynamic vulcanization of the rubber for about 2 minutes. Compositions not containing plasticizer were removed from the mixer at this point. Otherwise, plasticizer was added (blends 3-5) at this point while mixing continued until the power consumption recovered indicating that the plasticizer had been accepted by the blend.

The blend was removed from the mixer and sheeted on a mill prior to granulation. The granules obtained were injection moulded at a melt temperature of about 180° C.-200° C. to give sheet having a thickness of 1.5 mm suitable for the evaluation of the properties of the blend.

The formulations and properties of some typical blends are given in Table 1. Blends 1-2 and 7 are control blends of dynamically vulcanized natural rubber and polypropylene prepared under the same conditions as blends 3-5 and 6 respectively, which illustrate the invention. The same level of curative is used to dynamically vulcanize the rubber in all of the blends, 1.5 parts per hundred (pph) HVA-2 initiated with 0.15 pph DHBP. All of the blends contain 0.3 pph Irganox 1010 antioxidant. Blend 1 is the appropriate control blend for blends 3 and 4, because they all have the same polymer ratio, 80:20, and level of plasticizer (20 pph oil, DOP, or DOS). Similarly, blend 2 is the appropriate control blend for blend 5 and blend 7 is the appropriate control blend for blend 6.

TABLE 1

|  | 1 | 2 | 3 | 4 | 5 | 6 | 7 |
|---|---|---|---|---|---|---|---|
| PP GXM 43 | 20 | 25 | 20 | 20 | 25 | 20 | 20 |
| ENR-50 | — | — | 80 | 80 | 75 | 80 | — |
| SMR CV | 80 | 75 | — | — | — | — | 80 |
| 2280 | 20 | 15 | — | — | — | — | — |
| DOP | — | — | 20 | — | 15 | — | — |
| DOS | — | — | — | 20 | — | — | — |
| Gelation of ENR50 (%) | — | — | 83 | — | 85 | — | — |
| Properties: |  |  |  |  |  |  |  |
| Hardness (Shore A) | 56 | 70 | 73 | 72 | 85 | 89 | — |
| Tensile strength (MPa) | 5.4 | 8.4 | 7.34 | 5.82 | 9.45 | 9.2 | 9. |
| Ult. elongation (%) | 300 | 355 | 375 | 320 | 360 | 300 | 280 |
| Die C tear (N/mm) | 20 | 28 | 29.5 | 28.8 | 38.5 | 43 | 36 |
| Tension set (%) | 14.2 | 15.5 | 22 | 23.4 | 27.3 | 34 | 18 |
| Volume swell: |  |  |  |  |  |  |  |
| ASTM no. 3, 7 D., 100° C. | 190 | 160 | 29 | 27 | 30 | — | 210 |
| ASTM no. 3, 7 Oh., 125° C. | — | — | — | — | — | 57 | — |

In estimating the degree of gelation of the ENR50 in blends 3 and 5 by the technique described above, due allowance was made for the extraction of plasticizer from the composition. Tensile strength, ultimate elongation, and tear strength were measured in directions parallel to and perpendicular to the direction of flow in the mould and the values obtained were averaged to give the values quoted in the table. Tension set was measured in a direction at 45° to the direction of flow in the mould, and is the set remaining after 10 minutes relaxation following 10 minutes strain at 100% elongation.

It can be seen that the tensile strength and ultimate elongation of the blends of the invention compare favourably with those of the control blends. As expected, the oil-resistance of the blends of the invention is much better than that of the control blends.

The blends 1 to 6 in Table 2 were prepared in the manner described above, with the maleimide peroxide curatives (1.5 pph HVA-2 initiated with 0.15 pph DHBP) added after 5 min. All of the blends contained 1 pph Irganox 1010. Blends 1 to 4 allow a comparison of a blend of the present invention with dynamically vulcanized blends of nitrile rubber of various acrylonitrile content with polypropylene at a fixed rubber/polypropylene ratio. Blends 5 and 6 allow the comparison over a wider range of rubber/polypropylene ratio for nitrile rubber with a medium nitrile content. The tensile properties were measured on dumbbells cut from injection moulded sheet 2 mm thick in directions parallel to and perpendicular to the direction of flow in the mould and the values obtained were averaged to give the values in the table.

TABLE 2

|  | 1 | 2 | 3 | 4 | 5 | 6 |
|---|---|---|---|---|---|---|
| PP GXM 43 | 25 | 25 | 25 | 25 | 20 | 20 |
| ENR50 | 75 | — | — | — | 80 | — |
| NBR | — | 75 | 75 | 75 | — | 80 |
| Acrylonitrile (%) | — | 18 | 34 | 41 | — | 34 |
| DOP | 16 | 16 | 16 | 16 | — | — |
| Properties: |  |  |  |  |  |  |
| Hardness (Shore A) | 78 | 83 | 81 | 85 | 89 | 85 |
| M100 (MPa) | 5.4 | 5.8 | 5.8 | 5.0 | 6.3 | 5.7 |
| Ten. strength (MPa) | 8.9 | 6.9 | 6.7 | 6.2 | 9.2 | 6.7 |
| Ult. elongation(%) | 290 | 145 | 165 | 165 | 300 | 187 |
| TSB (MPa) | 34.7 | 16.9 | 17.8 | 16.4 | 36.8 | 19.2 |

Tensile strength, and particularly ultimate elongation of the blends of the invention are greater than those of the comparable blends containing nitrile rubber. True stress at break (TSB), defined as the product of tensile strength and extension ratio at break, is much greater for the blends of the invention.

The blends in Table 3 illustrate the invention over a wider range of compositions and curative levels. The blends were prepared and tested as for the blends in Table 2.

TABLE 3

|  | 1 | 2 | 3 | 4 |
|---|---|---|---|---|
| PP GXM 43 | 15 | 30 | 30 | 30 |
| ENR50 | 85 | 70 | 70 | 70 |
| DIDA | 30 | 30 | 20 | 40 |
| HVA-2 | 3.0 | 5.5 | 3.0 | 3.0 |
| DHBP | 0.3 | 0.55 | 0.3 | 0.3 |
| Properties: |  |  |  |  |

TABLE 3-continued

|  | 1 | 2 | 3 | 4 |
|---|---|---|---|---|
| Hardness (Shore A) | 59 | 84 | 86 | 74 |
| M100 (MPa) | 2.9 | 7.1 | 6.6 | 4.7 |
| Ten. strength (MPa) | 4.0 | 8.6 | 9.3 | 6.5 |
| Ult. elongation (%) | 160 | 140 | 218 | 187 |
| Die C tear (N/mm) | 15 | 24 | 35 | 22 |
| Tension set (%) | 10 | — | 26 | 17 |

The blends in Table 4 illustrate the use of different curative systems. The blends were prepared and tested as described above.

TABLE 4

|  | 1 | 2 | 3 | 4 | 5 |
|---|---|---|---|---|---|
| PP GXM 43 | 40 | 40 | 40 | 40 | 25 |
| ENR50 | 60 | 60 | 60 | 60 | 75 |
| DOP | — | — | — | — | 16 |
| ATM11 | 7.5 | — | — | — | — |
| Novor 924 | — | 2.5 | — | — | — |
| CBS | — | — | 1.0 | — | — |
| TMTD | — | — | 0.5 | — | — |
| TMTM | — | 1.0 | — | — | — |
| Sulphur | — | — | 0.1 | — | — |
| SP1045 | — | — | — | 4.0 | 5.0 |
| DHBP | 0.5 | 0.1 | — | — | — |
| Stannous chloride | — | — | — | 0.2 | — |
| Magnesium oxide | — | — | — | 0.04 | — |
| Zinc oxide | — | — | 2.0 | — | 2.0 |
| Stearic acid | — | — | 1.0 | — | — |
| Calcium oxide | — | 1.0 | — | — | — |
| Properties: |  |  |  |  |  |
| Hardness (Shore A) | 98 | 98 | 97 | 97 | 83 |
| M100 (MPa) | 10.8 | 11.7 | 12.6 | 11.0 | 5.6 |
| Ten. strength (MPa) | 12.2 | 12.0 | 13.4 | 11.4 | 6.9 |
| Ult. elongation (%) | 225 | 215 | 235 | 195 | 280 |
| TSB (MPa) | 39.8 | 37.6 | 45.0 | 33.4 | 26.0 |

The blends in Table 5 demonstrate that compatibilizing agents have a small effect on the ultimate properties of blends of the present invention. The modified polypropylene was prepared from polypropylene GXM 43 (100), phenolformaldehyde resin SP1045 (4), stannous chloride dihydrate (0.8) and magnesium oxide (0.15) in the manner described in EP-A-0036279 and the blends were prepared as described above. The residual stannous chloride and magnesium oxide from the modified polypropylene was used to activate the cure in blend 4. There is only a modest increase in true stress at break when the modified polypropylene is used as a replacement for the standard polypropylene.

TABLE 5

|  | 1 | 2 | 3 | 4 |
|---|---|---|---|---|
| PP GXM 43 | 40 | — | 40 | — |
| Modified PP | — | 40 | — | 40 |
| ENR50 | 60 | 60 | 60 | 60 |
| HVA-2 | 3.0 | 3.0 | — | — |
| DHBP | 0.3 | 0.3 | — | — |
| SP1045 | — | — | 4 | 4 |
| Stannous chloride | — | — | 0.2 | — |
| Magnesium oxide | — | — | 0.04 | — |
| Properties: |  |  |  |  |
| Hardness (Shore A) | 98 | 98 | 97 | 97 |
| M100 (MPa) | 12.8 | 12.2 | 11.0 | 9.9 |
| Ten. strength (MPa) | 14.5 | 15.8 | 11.4 | 10.6 |
| Ult. elongation (%) | 212 | 246 | 193 | 272 |
| TSB (MPa) | 45.2 | 54.7 | 33.4 | 39.4 |

Table 6 illustrates the good adhesion of blends of the invention to fabrics without the need for a bonding agent. The ENR50/PP blend is blend 5 of Table 1 and the NBR/PP blend is blend 3 of Table 2. The samples for the peel adhesion test were prepared by compression moulding: The cavity of a mould was lined with the fabric, one third of the length of the fabric was covered with melinex film and the mould was heated to 185° C. The blend was melted by passing through a plastics extruder to give melt at about 190° C. and this was laid onto the fabric in the pre-heated mould. The mould was returned to a press at 185° C. and a low pressure was applied until the melt was seen to flow. A high pressure was then applied for 10 minutes, after which the mould was cooled under pressure. The thickness of the layer of blend applied to the fabric was 2 mm. Parallel-sided strips 2 cm wide were cut from the samples and subjected to a 180° C. peel test at 23° C.

TABLE 6

| Fabric | Peel adhesion strength (N/mm) | |
|---|---|---|
|  | ENR50 | NBR/PP |
| Cotton | 1.84 | 0.84 |
| Rayon | 1.93 | 1.24 |
| Glass fibre | 0.78 | 0.41 |
| Kevlar | 0.72 | 0.37 |

Although this invention has been illustrated by typical examples, it is not limited thereto. For example, higher levels of crosslinking may be usefully employed, other polyolefins may be used, and other levels of epoxide modification of the natural rubber may be used.

We claim:

1. An elastoplastic composition comprising a blend of from 15 to 90 parts per hundred of the total weight of the blend of a thermoplastic polyolefin resin and 80 to 10 parts per hundred of the total weight of the blend of vulcanized epoxidized natural rubber having a level of epoxide modification in the range of 15 to 85 mole percent prior to vulcanization and a Mooney viscosity in the range of from 10 to 150 at 100° C.

2. A composition according to claim 1, wherein the thermoplastic polyolefin is polyethylene or polypropylene.

3. A composition according to claim 2, wherein the thermoplastic polyolefin is polypropylene.

4. A composition according to claim 1, wherein the blend comprises from 80 to 35 parts by weight of vulcanized epoxidised natural rubber and from 20 to 65 parts by weight of polyolefin.

5. A composition according to claim 1, wherein the vulcanized epoxidised natural rubber has, prior to vulcanization, a level of epoxide modification of about 50 mole %.

6. A composition according to claim 1, which also contains 0 to 25 parts per hundred by weight based on the total weight of the blend of a compatabilizing agent comprising a block copolymer having at least one segment which is compatible with the polyolefin and at least one segment which is compatible with epoxidized natural rubber.

7. A method of producing an elastoplastic composition as claimed in claim 1 which comprises mixing the thermoplastic polyolefin resin and epoxidised natural rubber at a temperature sufficient to soften or melt the resin so as to form an intimate blend of resin and epoxidised natural rubber, then while continuing the mixing adding curative for the rubber in an amount sufficient to achieve essentially complete gelation of the epoxidised natural rubber, and continuing the mixing at a vulcanization temperature until vulcanization of the epoxidised natural rubber is complete.

8. A method according to claim 7, wherein the thermoplastic polyolefin is polyethylene or polypropylene.

9. A method according to claim 8, wherein the thermoplastic polyolefin is polypropylene.

10. A method according to claim 7, wherein the epoxidised natural rubber has a level of epoxide modification of about 50 mole %.

11. A method according to claim 7, wherein the blend comprises from 80 to 35 parts by weight of epoxidised natural rubber and from 20 to 65 parts by weight of polyolefin.

12. A method according to claim 7, wherein, prior to the vulcanization stage, 0 to 25 parts per hundred by weight of the total weight of the blend of a compatibilizing agent comprising a block copolymer having at least one segment which is compatible with the polyolefin and at least one segment which is compatible with the epoxidized natural rubber is incorporated into the blend of epoxidized natural rubber and polyolefin.

13. A method according to claim 12, wherein the compatibilizing agent is formed in situ in the blend from one or more suitable percursors, which precursors are present in amounts ranging from 0 to the total replacement of the polyolefin blend when said one or more suitable percursors are suitable modified olefins.

14. A method according to claim 7, wherein one or more plasticizers are incorporated into the blend in amounts of 0 to 60 parts per hundred, based on the total weight of the polymeric blend.

* * * * *